(12) United States Patent  
Glickman

(10) Patent No.: US 8,366,170 B2  
(45) Date of Patent: Feb. 5, 2013

(54) LIGHTWEIGHT UNDER ENGINE SHIELD

(75) Inventor: David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 302 days.

(21) Appl. No.: 12/857,871

(22) Filed: Aug. 17, 2010

(65) Prior Publication Data

US 2012/0043779 A1    Feb. 23, 2012

(51) Int. Cl.  
B62D 21/00    (2006.01)

(52) U.S. Cl. .................. 296/39.3; 296/204; 180/69.1

(58) Field of Classification Search .............. 296/204, 296/39.3; 180/69.1  
See application file for complete search history.

(56) References Cited

U.S. PATENT DOCUMENTS 4,898,419 A * 2/1990 Kenmochi et al. ............ 296/204

FOREIGN PATENT DOCUMENTS

| EP | 1316691 A1 | 11/2002 |
| GB | 2345274 A | 7/2000 |
| WO | 2007080125 A1 | 7/2007 |

OTHER PUBLICATIONS

Smock, Doug, "New DuPont Nylons Boost Under-the-Hood Performance," Design News, Mar. 2, 2010 (6 pages).
"Reiter Ultra Silent," http://www.rieter.com/en/general/products/rieter-ultra-silent-trade/, Mar. 16, 2010 (1 page).
Fischer, Wolfgang, P.P., et al., "Concept Studies of a Ceramic Engine Heat Shield for RLV Application," SAE Technical Paper Series No. 2001-01-2338, 31st International Conference on Environmental Systems, Orlando, Florida, Jul. 9-12, 2001 (12 pages).
Winnard, Dave, et al., "Underhood Thermal Management by Controlling Air Flow," SAE Technical Paper Series No. 951013, International Congress and Exposition, Detroit, Michigan, Feb. 27-Mar. 2, 1995 (8 pages).

* cited by examiner

Primary Examiner — Joseph Pape  
(74) Attorney, Agent, or Firm — Raymond L. Coppiellie; Price Heneveld LLP

(57) ABSTRACT

A heat shield having a body portion formed from a non-woven material and having an internal side and an external side. First and second heat patches are disposed on the internal side of the body portion. A first channel is disposed between the first and second heat patches and a second channel is disposed under the first and second heat patches. A convex air drafting portion is disposed on a rearward side of said vehicular heat shield.

20 Claims, 4 Drawing Sheets

US 8,366,170 B2

LIGHTWEIGHT UNDER ENGINE SHIELD

FIELD OF THE INVENTION

The present invention generally relates to an under engine shield, and more particularly relates to a non-woven lightweight under engine shield with enhanced engine cooling characteristics.

BACKGROUND OF THE PRESENT INVENTION

Under engine shields are generally found under a vehicle to protect the engine and enhance aerodynamic properties. The shields are frequently rigid, very heavy, and often times do not pass air into the engine compartment. The heavy weight of the shields can make them difficult to install and repair.

SUMMARY OF THE PRESENT INVENTION

One aspect of the present invention includes a heat shield having a body portion formed from a non-woven material and having an internal side and an external side. First and second heat patches are disposed on the internal side of the body portion. A first channel is disposed between the first and second heat patches and a second channel is disposed under the first and second heat patches. A convex air drafting portion is disposed on a rearward side of said vehicular heat shield.

Another aspect of the present invention includes a vehicular heat shield having a body portion formed from a non-woven material and having an internal side and an external side. First and second heat patches are disposed on the internal side of the body portion. A longitudinally-extending channel is disposed in the body portion between the first and second heat patches. A convex air drafting portion is disposed on a rearward side of said vehicular heat shield.

Yet another aspect of the present invention includes a vehicular heat shield having a body portion formed from a non-woven material and having an internal side and an external side. At least one heat patch is disposed on the internal side of the body portion. First and second side shield portions are integral with the body portion. A convex air drafting portion is disposed on a rearward side of said vehicular heat shield.

These and other aspects, objects, and features of the present invention will be understood and appreciated by those skilled in the art upon studying the following specification, claims, and appended drawings.

DETAILED DESCRIPTION OF EMBODIMENTS

Figure 1:
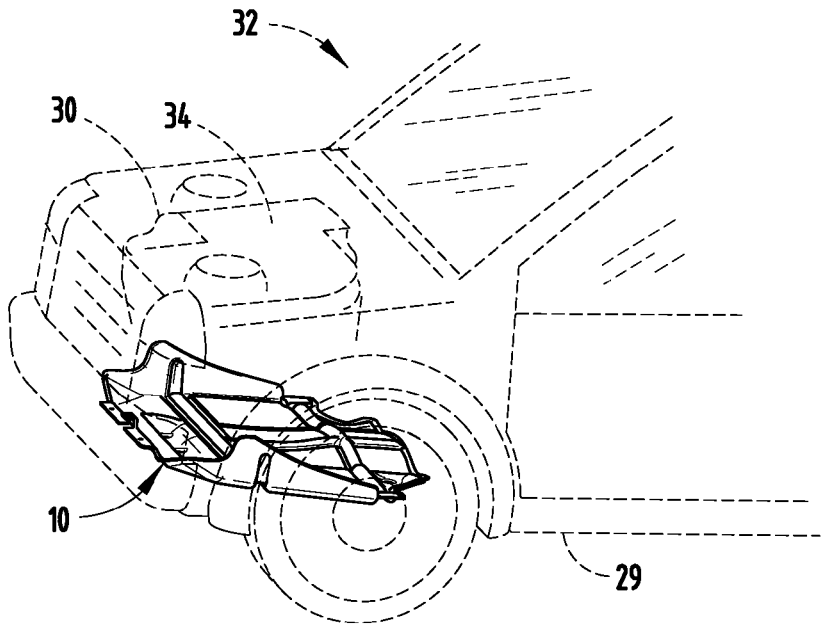
FIG. 1 is a top perspective view of one embodiment of a heat shield of the present invention positioned on a vehicle.
Figure 2:
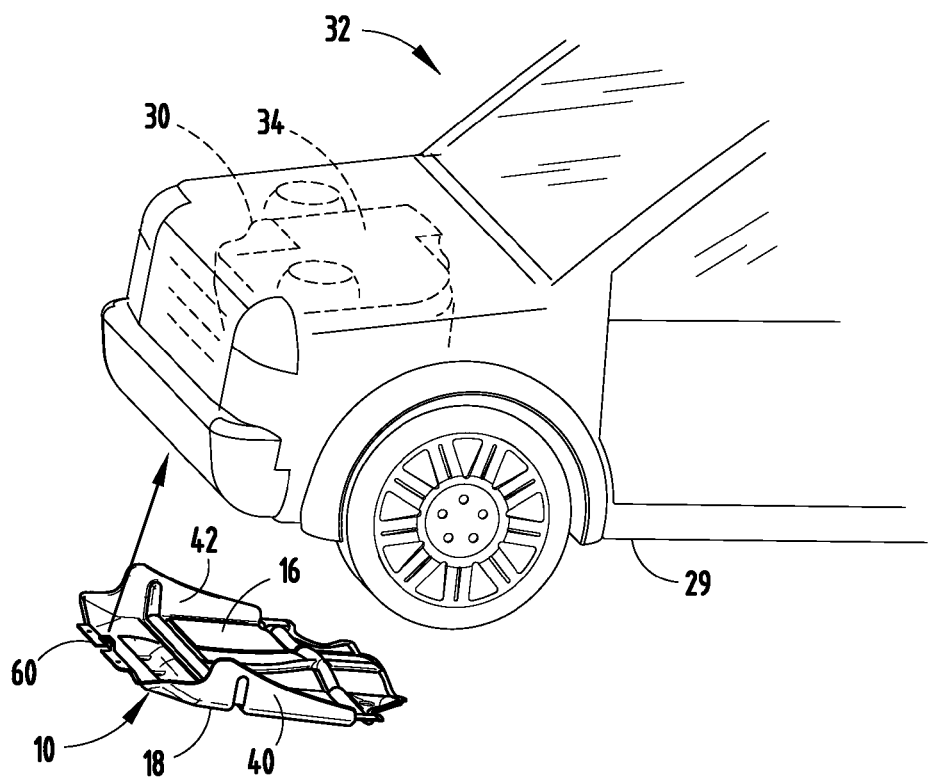
FIG. 2 is a top perspective view of the heat shield of FIG. 1 with the heat shield removed from the vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-4, the reference numeral 10 generally designates a heat shield having a body portion 12 formed from a non-woven material 14. The body portion 12 includes an internal side 16 and an external side 18. First and second heat patches 20, 22 are disposed on the internal side 16 of the body portion 12. A first channel 24 is disposed between the first and second heat patches 20, 22 and a second channel 26 is disposed at least partially under the first and second heat patches 20, 22. An air drafting portion 27 is disposed on a back edge 28 of the vehicular heat shield 10.

Referring again to FIGS. 1 and 2, the under engine heat shield 10 is designed for placement on the underbody structure 29 below an engine compartment 30 of a vehicle 32. The under engine heat shield 10 is constructed from a non-woven polymeric material, such as polypropylene, having a high tolerance to excessive heat, which radiates from a vehicle engine 34 located in the engine compartment 30 of the vehicle 32. The heat shield 10 has a shape that generally conforms to the shape of the underbody structure 29 of the vehicle 32 to which the heat shield 10 is connected. Additionally, the under engine heat shield 10 is lightweight and includes a semi-rigid construction that has some flexibility and pliability. Many traditional under engine heat shield systems include heat shields that are rigid and constructed from a metallic material, such as steel. Heat shields having this construction are prone to denting, and as a result of their rigid construction, oftentimes rattle or vibrate under the vehicle 32 when the vehicle 32 is moving. The flexible construction of the under engine heat shield 10 of the present invention minimizes noise, vibration, and harshness characteristics that are sometimes attributable to rigid non-flexible under engine heat shields that have been utilized in the past. Further, the flexible construction of the under engine heat shield 10 acts as an acoustic barrier that has superior acoustic properties compared to traditional rigid acoustic under engine shields. The exceptional acoustic performance of the heat shield 10 is due, in part, to the flexible and pliable polymeric material that possesses inherent acoustic properties and that forms the body portion 12 of the heat shield 10. This design eliminates the need for separate acoustic patches found on traditional rigid acoustic under engine shields. The inherent acoustic properties of the polymeric material in the present invention exhibit superior acoustic function as heightened acoustic performance is not limited to only those locations where patches are mounted on traditional rigid acoustic heat shield designs.

Referring now to FIGS. 3-8, the body portion 12 of the heat shield 10 includes first and second side shield portions 40, 42 that are integral with the body portion 12 and extend substantially orthogonally to the planar extent of the body portion 12. The first and second side shield portions 40, 42 are shaped to conform with the underbody structure 29 of the vehicle 32 and help minimize dust and water from entering the space between the heat shield 10 and the vehicle 32. The first and second side shield portions 40, 42 include peaks 43, 44 (FIG. 4), respectively, that taper gradually downward toward a rear end 46 of the heat shield 10. First and second forward arcuate portions 48, 50 (FIG. 5) are adjacent the peaks 44 of the first and second side shields 40, 42, respectively. The arcuate portions 48, 50 are designed to conform to the underbody structure 29 of the vehicle 32 to which the heat shield 10 is connected. An edge 51 (FIG. 8) of the first and second side shields 40, 42 includes an offset 52 (FIG. 8), which provides each of the first and second side shields 40, 42 to maintain a transverse orientation relative to the body portion 12 of the heat shield 10.

Figure 9:
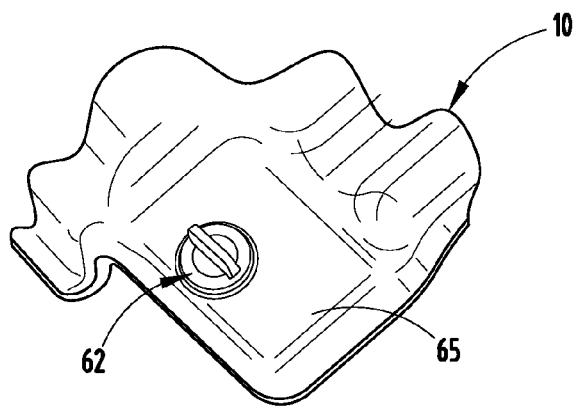
FIG. 9 is a bottom elevational view of a fastening member of the present invention.

Referring now to FIGS. 3-6, a forward end 54 of the heat shield 10 includes a forward engagement flange 56 that is integral with the body portion 12 and that assists in connection of the heat shield 10 to the underbody structure 29 of the vehicle 32. The forward engagement flange 56 includes a substantially vertical portion 58 and a substantially horizontal portion 59. The vertical portion 58 extends upwardly from the forward end 54 of the heat shield. The horizontal portion 59 extends forward from the vertical portion 58 and includes an assembly aid hook 60 designed to engage a lip (not shown) on the underbody structure 29 of the vehicle 32. The forward engagement flange 56, as illustrated, also includes fastener apertures 61 adapted to receive mechanical fasteners 62 that secure the forward engagement flange 56, and consequently the heat shield 10 to the underbody structure 29. The assembly aid hook 60 assists the manufacturer during the installation of the heat shield 10. Specifically, the assembly aid hook 60 engages the underbody structure 29, thereby temporarily securing the heat shield 10 to the vehicle 32 while the mechanical fasteners 62 are secured to the underbody structure 29. The mechanical fasteners 62 may be a quick connect fastener, such as that shown in FIG. 9, which are metallic quarter turn fasteners that are hand-fastenable such that additional tools are not needed to secure the heat shield 10 in place. The quick connect fasteners 62 allow for quick and easy installation of the heat shield 10 during the manufacturing of the vehicle 32. Additionally, in the event that the vehicle 32 needs to be serviced or the heat shield 10 is damaged, the heat shield 10 can be quickly removed by disengaging the quick connect fasteners 62 by hand, and after completing any repairs, installing the same heat shield 10 or a replacement heat shield 10 using the quick connect fasteners 62. The quick connect fastener 62 may be positioned at recessed corner features 65 of the heat shield 10. The recessed corner features 65 are designed to abut the underbody structure 29 of the vehicle 32, which minimizes the introduction of dirt and debris near the fastener 62 locations and at the front of the heat shield 10.

Figure 4:
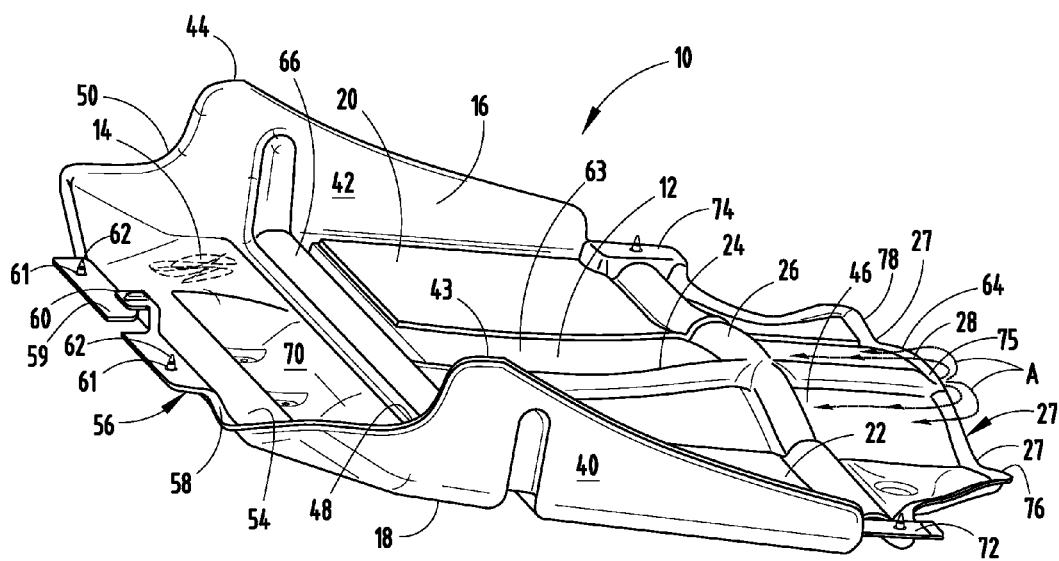
FIG. 4 is an enlarged top perspective view of the heat shield of FIG. 1.
Figure 5:
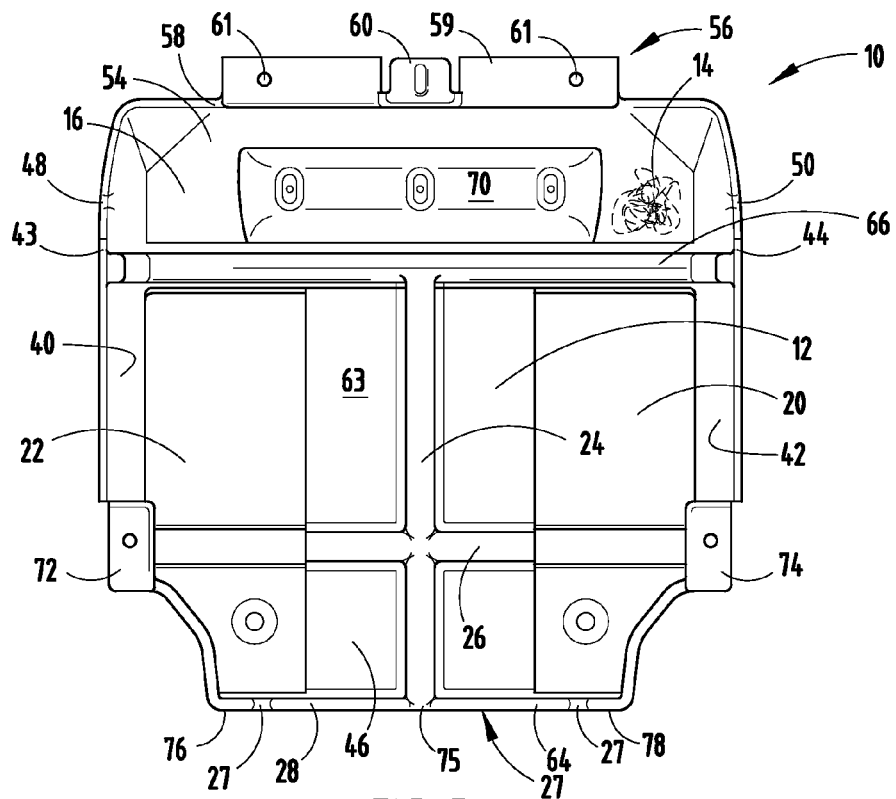
FIG. 5 is a top elevational view of the heat shield of FIG. 1.
Figure 6:
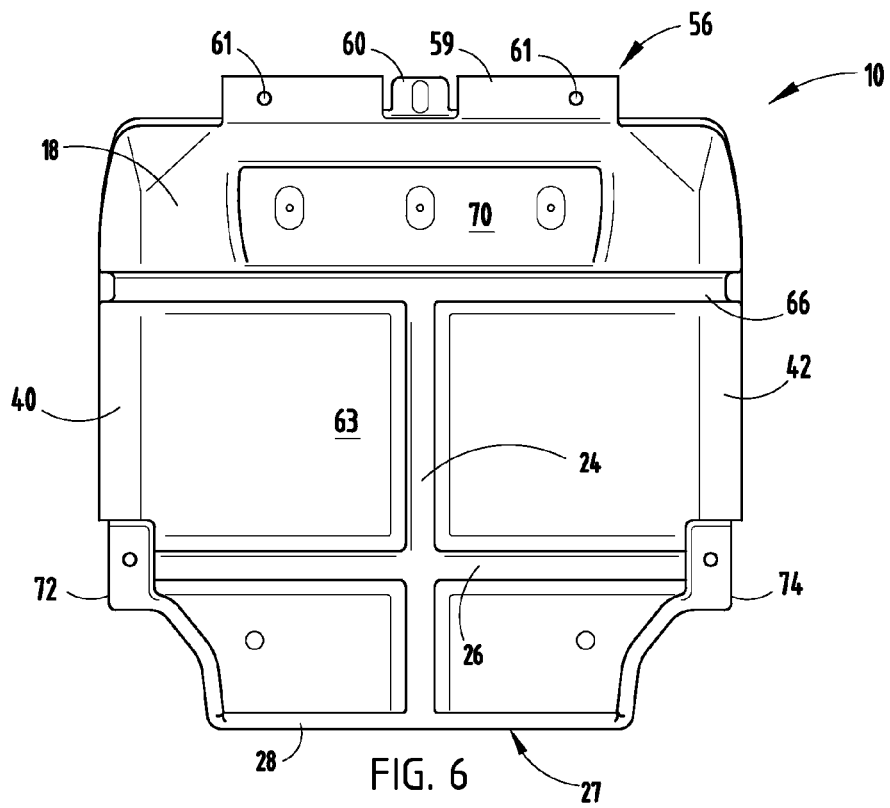
FIG. 6 is a bottom elevational view of the heat shield of FIG. 1.

Referring now to FIGS. 4 and 5, the first channel 24 includes a semicircular cross-section. However, it is contemplated that other cross-section shapes or arrangements may also be utilized, such as an inverted V-shape or half-hexagonal shape. It is also contemplated that the first channel 24 could be convex down instead of convex up as illustrated. The first channel 24 provides structural rigidity to the otherwise flexible under engine heat shield 10. The first channel 24 extends longitudinally through a midportion 63 of the heat shield 10 in a direction substantially orthogonal to the second channel 26 and terminates at back edge 64. The second channel 26 abuts and opens to the first channel 24 and also includes a semicircular cross-section. As with the first channel 24, it is contemplated that other cross-sections may be utilized in the second channel 26. The second channel 26 is disposed proximate the rear end 46 of the heat shield 10 and extends orthogonal to the first channel 24. A third channel 66 of the heat shield 10 extends laterally across the heat shield 10 between the first and second side shields 40, 42. In the illustrated embodiment, the third channel 66 extends at least partially upward along each of the first and second side shields 40, 42 as well. The third channel 66 is in front of the second channel 26 and is generally parallel therewith. Each of the first, second and third channels 24, 26, 66 assist in providing structural integrity to the heat shield 10 to provide some stiffness without compromising flexibility. It is contemplated that additional channels could also be present that extend along or across the heat shield 10.

Referring again to FIGS. 4 and 5, the internal side 16 of the body portion 12 includes the first and second heat patches 20, 22, which may be attached to the body portion 12 by mechanical fasteners, adhesive, thermal welding, or other known connection manners readily understood by one having ordinary skill in the art. The first and second heat patches 20, 22 have the affect of radiating heat that is released from the engine compartment 30 downward onto the heat shield 10. The first and second heat patches 20, 22 protect the heat shield 10, and at the same time, minimize radiated heat that would otherwise be radiated to the ground and to other components disposed on the underbody structure 29 if the heat shield 10 was not in place. The first and second heat patches 20, 22 include a top foil layer, as well as an intermediate material that keeps the foil from being disposed directly on the internal side 16 of the body portion 12. The first and second heat patches 20, 22 have minimal clearance and extend all the way from the first channel 24 of the heat shield 10 to the back edge 28 of the heat shield 10. It is contemplated that the first and second heat patches 20, 22 could connect in the middle of the heat shield 10 proximate the second channel 26.

Figure 3:
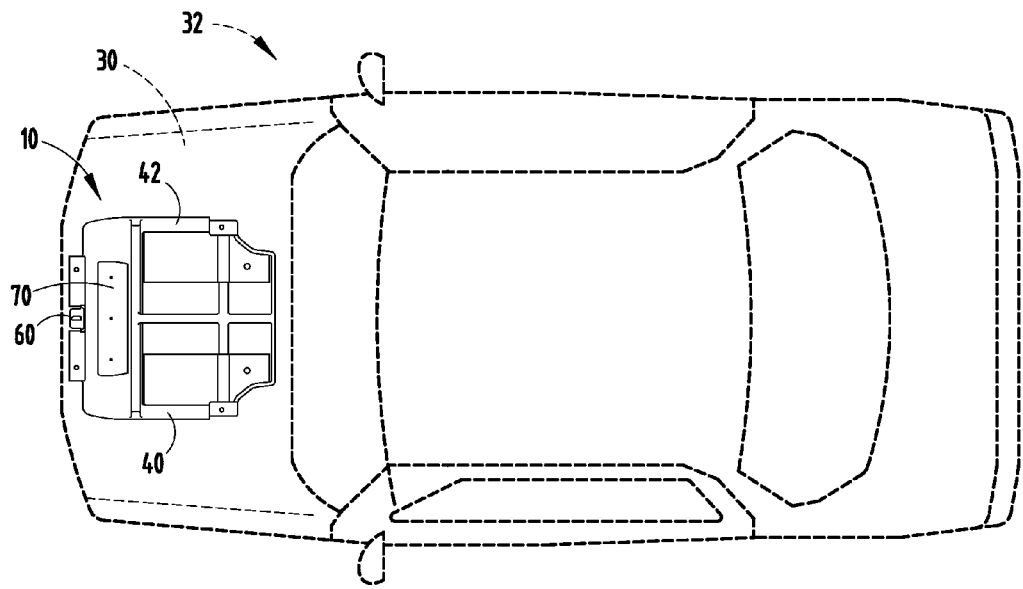
FIG. 3 is a top elevational view of the heat shield of FIG. 1.

As is shown in FIGS. 3-5, an indent 70 is disposed in front of the first channel 24 in the body portion 12. The indent 70 is adapted to abut a securing member disposed on the underbody structure 29 of the vehicle 32. Fastener apertures are disposed in the indent 70 and are designed to receive fasteners that secure the body portion 12 of the heat shield 10 to the underbody structure 29. Any number of fastener apertures may be disposed in the indent 70. Additionally, it is contemplated that there may be no fastener apertures disposed in the indent 70, and that threaded fasteners may be fastened to the underbody structure 29 of the vehicle 32 through the body portion 12 of the heat shield 10.

Figure 7:
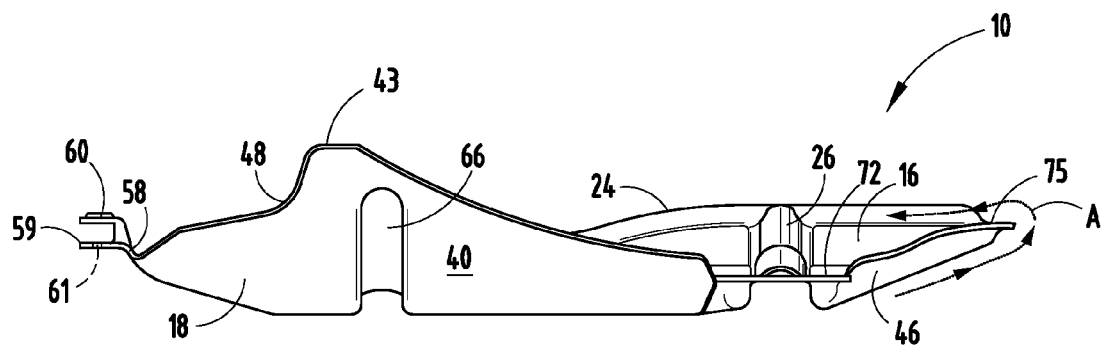
FIG. 7 is a side elevational view of the heat shield of FIG. 1.

Referring now to FIGS. 4, 5, and 7, the rearward or third channel 66 extends across the rear end 46 of the body portion 12 and terminates proximate first and second side connection flanges 72, 74. Each of the first and second side connection flanges 72, 74 include fastener apertures adapted to receive fasteners to secure the heat shield 10 to the underbody structure 29 of the vehicle 32. The first and second side connection flanges 72, 74 are disposed adjacent to the first and second side shield portions 40, 42, respectively. More specifically, the first and second side connection flanges 72, 74 are disposed adjacent to and behind the first and second forward arcuate portions 48, 50, respectively. The first and second side connection flanges 72, 74 are designed to support the body portion 12 of the heat shield 10. As discussed in detail above, the forward engagement flange 56 supports a front end of the heat shield 10 connecting it to the underbody structure 29 of the vehicle 32.

Figure 8:
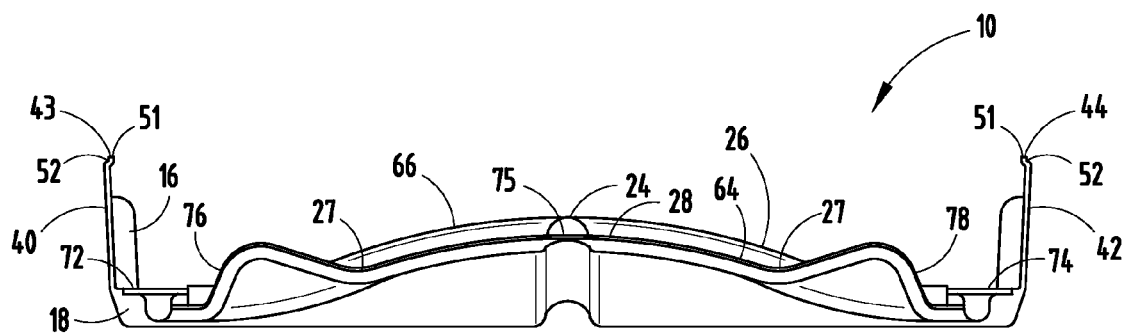
FIG. 8 is a rear elevational view of the heat shield of FIG. 1.

Referring now to FIGS. 7 and 8, the back edge 64 of the under engine shield 10 has a central arcuate portion 75 with two linear side segments 76, 78 (FIG. 8). The central arcuate portion 75 is convex up (or concave down) and has the effect of drawing air between the heat shield 10 and the engine compartment 36 while the vehicle 32 is moving. The central arcuate portion 75, in combination with the two linear side segments 76, 78, form the shallow V-shaped drafting portions 27. The drafting portions 27 effectively draw air between the heat shield 10 and the engine compartment 30 along arrows A, which consequently has the affect of cooling the engine compartment 30, and consequently the engine. As the vehicle 32 increases in velocity, so does the air volume that passes between the drafting portion 27 and the underbody structure 29 of the vehicle 32.

The under engine heat shield 10 of the present invention is constructed from non-woven geotextile fibers that are compressed in a matrix to form a flat sheet having a predetermined thickness. The under engine heat shield 10 is then thermoformed into a shape that generally conforms to the underside of the vehicle 32 and provides the desired effect. The under engine heat shield 10 may include an adhesive that holds the fibers in place and keeps the under engine heat shield 10 at the desired thickness. The adhesive has weather resistant properties such that the under engine heat shield 10 maintains its shape after continued use outdoors.

The general construction and shape of the heat shield 10 is designed to prevent damage to the heat shield 10 when objects disposed below the vehicle 32 strike the heat shield 10. The heat shield 10 has a relatively small profile, such that the heat shield 10 does not extend downward substantially from the underbody structure 29 of the vehicle 32, thereby minimizing the likelihood of damage to the heat shield 10 while the vehicle 32 is moving. However, the heat shield 10 is also substantially flexible, such that in the event a foreign object strikes the heat shield 10, the heat shield 10 may maintain its shape or deform slightly upon impact from the foreign object. If the heat shield 10 deforms, it is likely that the deformity can be repaired by application of force against the deformity, such that the heat shield 10 returns to its original shape. In the event that the heat shield 10 cannot be repaired, then a new heat shield 10 can be installed, as disclosed in more detail above, by hand removal of the mechanical fasteners 62 from engagement with the underbody structure 29 of the vehicle 32.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular heat shield comprising:
a body portion formed from a non-woven geotextile and having an internal side and a rearward edge;
first and second heat patches disposed on the internal side of the body portion;
a longitudinally extending channel and a laterally extending rearward channel extending through an intermediate area of the body portion; and
an arcuate portion disposed on the rearward edge defining drafting members that draw air forward over the body portion.

2. The vehicular heat shield of claim 1, further comprising:
first and second side shield portions integral with the body portion.

3. The vehicular heat shield of claim 1, further comprising:
a forward raised engagement flange.

4. The vehicular heat shield of claim 1, further comprising:
a laterally extending forward channel extending through an intermediate area of the body portion in front of the laterally extending rearward channel.

5. The vehicular heat shield of claim 1, wherein the body portion is formed from a polypropylene material.

6. The vehicular heat shield of claim 5, wherein the geotextile includes a binding agent that is approximately 5% of the vehicular heat shield by weight.

7. A vehicular heat shield comprising:
a body portion formed from a non-woven geotextile and having an internal side and an external side;
first and second heat patches disposed on the internal side of the body portion;
a longitudinally-extending channel disposed in the body portion between the first and second heat patches; and
a convex air drafting portion disposed on an edge of the body portion to draw air over the of portion.

8. The vehicular heat shield of claim 7, further comprising:
a forward raised engagement flange.

9. The vehicular heat shield of claim 7, further comprising:
first and second side shield portions integral with the body portion.

10. The vehicular heat shield of claim 7, further comprising:
reinforced corner tabs extending from the body portion.

11. The vehicular heat shield of claim 10, further comprising:
reinforced metal grommets extending through the reinforced corner tabs.

12. The vehicular heat shield of claim 7, further comprising:
a laterally-extending channel disposed in the body portion.

13. The vehicular heat shield of claim 7, further comprising:
a forward laterally-extending channel disposed in the body portion; and
a rearward laterally-extending channel disposed in the body portion.

14. The vehicular heat shield of claim 7, wherein the non-woven geotextile is formed from a polypropylene material.

15. A vehicular heat shield comprising:
a body portion formed from a non-woven geotextile and having an internal side and an external side;
at least one heat patch disposed on the internal side of the body portion;
first and second side shield portions integral with the body portion;
first and channels extending laterally through an intermediate area of the body portion; and
a convex air drafting portion disposed on the body portion.

16. The vehicular heat shield of claim 15, further comprising:
a forward raised engagement flange.

17. The vehicular heat shield of claim 15, further comprising:
a longitudinally-extending channel disposed centrally in the body portion.

18. The vehicular heat shield of claim 15, further comprising:
reinforced corner tabs extending from the body portion.

19. The vehicular heat shield of claim 15, wherein the first channel extends onto the first and second side shield portion.

20. The vehicular heat shield of claim 15, wherein the non-woven geotextile is formed from a polypropylene material.

* * * * *